US006903650B2

(12) United States Patent
Murray

(10) Patent No.: US 6,903,650 B2
(45) Date of Patent: Jun. 7, 2005

(54) OPERATOR WITH TRANSMITTER STORAGE OVERWRITE PROTECTION AND METHOD OF USE

(75) Inventor: James S. Murray, Milton, FL (US)

(73) Assignee: Wayne-Dalton Corp., Mt. Hope, OH (US)

(*) Notice: Subject to any disclaimer, the term of this patent is extended or adjusted under 35 U.S.C. 154(b) by 331 days.

(21) Appl. No.: 10/152,222

(22) Filed: May 20, 2002

(65) Prior Publication Data

US 2003/0214385 A1 Nov. 20, 2003

(51) Int. Cl.[7] .......................... G05B 19/00; H04Q 1/00; H04Q 7/00; G08C 19/00; G08C 19/10

(52) U.S. Cl. .................... 340/5.23; 340/5.22; 340/5.64; 340/5.7; 340/5.71; 340/825.72; 340/825.69; 341/176

(58) Field of Search ........................... 340/5.23, 825.72, 340/825.31, 5.7, 5.71, 825.22, 5.64, 870.11, 825.5; 341/176

(56) References Cited

U.S. PATENT DOCUMENTS

| | | | | |
|---|---|---|---|---|
| 4,228,424 A | | 10/1980 | Le Nay et al. | 340/506 |
| 4,283,710 A | | 8/1981 | Genest et al. | 340/149 R |
| 4,529,980 A | | 7/1985 | Liotine et al. | 340/825.52 |
| 4,772,876 A | | 9/1988 | Laud | 340/539 |
| 4,847,542 A | | 7/1989 | Clark et al. | 318/560 |
| 4,855,713 A | | 8/1989 | Brunius | 340/506 |
| 4,881,148 A | | 11/1989 | Lambropoulos et al. | 361/172 |
| 5,077,547 A | | 12/1991 | Burgmann | 340/501 |
| 5,148,159 A | | 9/1992 | Clark et al. | 340/825.22 |
| 5,252,960 A | * | 10/1993 | Duhame | 340/5.64 |
| 5,291,193 A | | 3/1994 | Isobe et al. | 340/825.69 |
| 5,349,345 A | * | 9/1994 | Vanderschel | 340/5.25 |
| 5,408,217 A | | 4/1995 | Saunderford, Jr. | 340/506 |
| 5,473,318 A | | 12/1995 | Martel | 340/825.31 |
| RE35,364 E | | 10/1996 | Heitschel et al. | 364/400 |
| 5,635,913 A | | 6/1997 | Willmott et al. | 340/825.22 |
| 5,751,224 A | | 5/1998 | Fitzgibbon | 340/825.22 |
| 5,781,143 A | | 7/1998 | Rossin | 341/173 |
| 5,854,593 A | | 12/1998 | Dykema et al. | 340/825.22 |
| 5,907,288 A | * | 5/1999 | Clark et al. | 340/5.54 |
| 5,945,936 A | * | 8/1999 | Issa | 341/176 |
| 6,049,289 A | | 4/2000 | Waggamon et al. | 340/825.31 |
| RE36,703 E | | 5/2000 | Heitschel et al. | 700/90 |

* cited by examiner

*Primary Examiner*—Michael Horabik
*Assistant Examiner*—Kimberly Jenkins
(74) *Attorney, Agent, or Firm*—Renner, Kenner, Greive, Bobak, Taylor & Weber

(57) ABSTRACT

An operator (32) with transmitter overwrite protection is used with a plurality of different transmitters (40, 42, 44). Each type of transmitter has at least one command button that when actuated generates a signal which includes at least a transmitter identifying code. The operator includes a receiver (170) capable of receiving the signal from any of the plurality of transmitters and a memory device (62) that has a plurality of storage locations (63*a–f*). A controller (60) is connected to the receiver and the controller stores each transmitter identifying code in a corresponding storage location. The controller overwrites one of the transmitter identifying codes in a corresponding storage location when a new transmitting code is learned if the plurality of storage locations are full, except for the transmitter identifying codes for one specific type of the plurality of transmitters. In the preferred embodiment, the specific type of transmitter is a wall station transmitter (42) with more than one function button. The different types of transmitters may be provided with corresponding levels of overwrite priority.

18 Claims, 3 Drawing Sheets

OPERATOR WITH TRANSMITTER STORAGE OVERWRITE PROTECTION AND METHOD OF USE

TECHNICAL FIELD

Generally, the present invention relates to a garage door operator system for use on a closure member moveable relative to a fixed member. More particularly, the present invention relates to an operator system that stores transmitter codes for several different transmitter types. Specifically, the present invention relates to an operator system that protects certain types of transmitter codes from being overwritten or replaced with codes of other transmitters.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. It is also known to provide safety devices that are connected to the operator for the purpose of detecting an obstruction so that the operator may then take corrective action with the motor to avoid entrapment of the obstruction.

There are three basic types of transmitters that can be used to instruct an operator to initiate a desired action. A portable or remote transmitter is usually kept in the user's vehicle and allows the user to open and close the door from inside the vehicle. The portable transmitter may have several buttons, wherein each button is associated with operation of a different door. A wall station transmitter is usually mounted near an interior door of the garage and allows the user to open and close the garage door as needed. The wall station may include function buttons to allow programming of the operator, delay closing of the door, setting of a pet height and other functions. The other type of transmitter is a keypad, which is typically mounted outside the garage, that requires manual entry of a code prior to sending an open/close signal. These remote devices may also be provided with additional features such as the ability to control multiple doors, lights associated with the doors, and other security features.

In order for a transmitter device to work with an operator to control movement of the garage door, the operator must be programmed to learn the particular serial number code for each transmitter. In the past, radio controls utilized a code setable switch, such as a ten-circuit DIP switch to set the data for both the transmitter and the receiver. Both the transmitter and the receiver's code switch must match for the transmitter to activate the receiver's output. This method did not allow for enough unique codes and was relatively easy for someone to copy the code and gain improper access. Accordingly, this process required the setting of transmitter and receiver codes physically switched to identical settings for operation of the garage door.

Presently, most radio controls for garage doors use either a fixed code format wherein the same data for each transmission is sent, or a rolling-code format, wherein some or all of the data changes for each transmission. A fixed code transmitter, also known as a fixed address or a fixed serial number transmitter, is assigned and factory programmed into a transmitter's non-volatile memory during the manufacturing of the product. A receiver is designed to "learn" a transmitter's code and the transmitter's code is stored in the receiver's non-volatile memory. This increased the number of possible codes (from 1024 or 19,683 to millions) and eliminated the DIP switch. This also prevented the code from being visible, as is the case with the DIP switch transmitter, thus preventing theft of the code.

A rolling code transmitter is similar to a fixed code transmitter, but at least a portion of the address, also known as the code or serial number, is changed with every operation of the transmitter. The transmitter and the corresponding receiving unit use an algorithm to determine what the next code to transmit/receive shall be. Only the proper code will activate the receiver.

As is well documented in the art, there are several different ways to program an operator so that it is responsive to a transmitter. One method of entering a program mode is to actuate a button directly associated with the operator and then actuate a transmitter button so that the operator learns the transmitter's serial number. Regardless of how a serial number is learned, the operator stores the number as entered. Problems arise in programming new transmitters when the memory of the operator is completely filled with transmitter serial numbers. In known operator systems, the operator simply overwrites previously stored transmitter codes. This is problematic when a wall station transmitting code is overwritten or deleted since the wall station transmitter includes extra functions utilized for operation of the garage door operator system. Therefore, there is a need in the art to ensure that wall station transmitter codes are not inadvertently deleted when programming a new transmitter code for use with the operator.

DISCLOSURE OF THE INVENTION

One of the aspects of the present invention, which shall become apparent as the detailed description proceeds, is achieved by an operator with transmitter overwrite protection, including a plurality of different transmitters, each of the transmitters having at least one command button that when actuated generates a signal which includes at least a transmitter identifying code; a receiver capable of receiving the signal from any of the plurality of transmitters; a memory comprising a plurality of storage locations and a controller connected to the receiver, the controller storing each transmitter identifying code in a corresponding one of the plurality of storage locations, the controller overwriting one of the transmitter identifying codes in a corresponding one of the plurality of storage locations when a new transmitter identifying code is learned if the plurality of storage locations are full, except for the transmitter identifying codes for one specific type of the plurality of transmitters.

Another aspect of the present invention is attained by a method for protecting transmitter codes stored by a movable barrier operator, including providing in the operator a controller with a receiver capable of receiving signal transmissions, providing a memory device connected to the controller, the memory device having a plurality of storage locations, learning any one of a plurality of different transmitters each of which has a transmitter identifying code contained in the signal, storing each transmitter identifying code in a corresponding one of the plurality of storage locations, and overwriting one of the plurality of storage locations with a new transmitter identifying code if all the plurality of storage locations are full when a new transmitter is learned, except for those plurality of storage locations storing transmitter identifying codes for one specific type of the plurality of transmitters.

Still another aspect of the present invention is attained by a movable barrier operator system, comprising a plurality of transmitters, each having a transmitter identifying code, wherein certain transmitter identifying codes have priority over other transmitter identifying codes; and a controller having a memory device with a plurality of storage locations, the controller receiving and storing the transmitter identifying codes in the storage locations, wherein priority transmitter identifying codes are never overwritten by other transmitter identifying codes.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
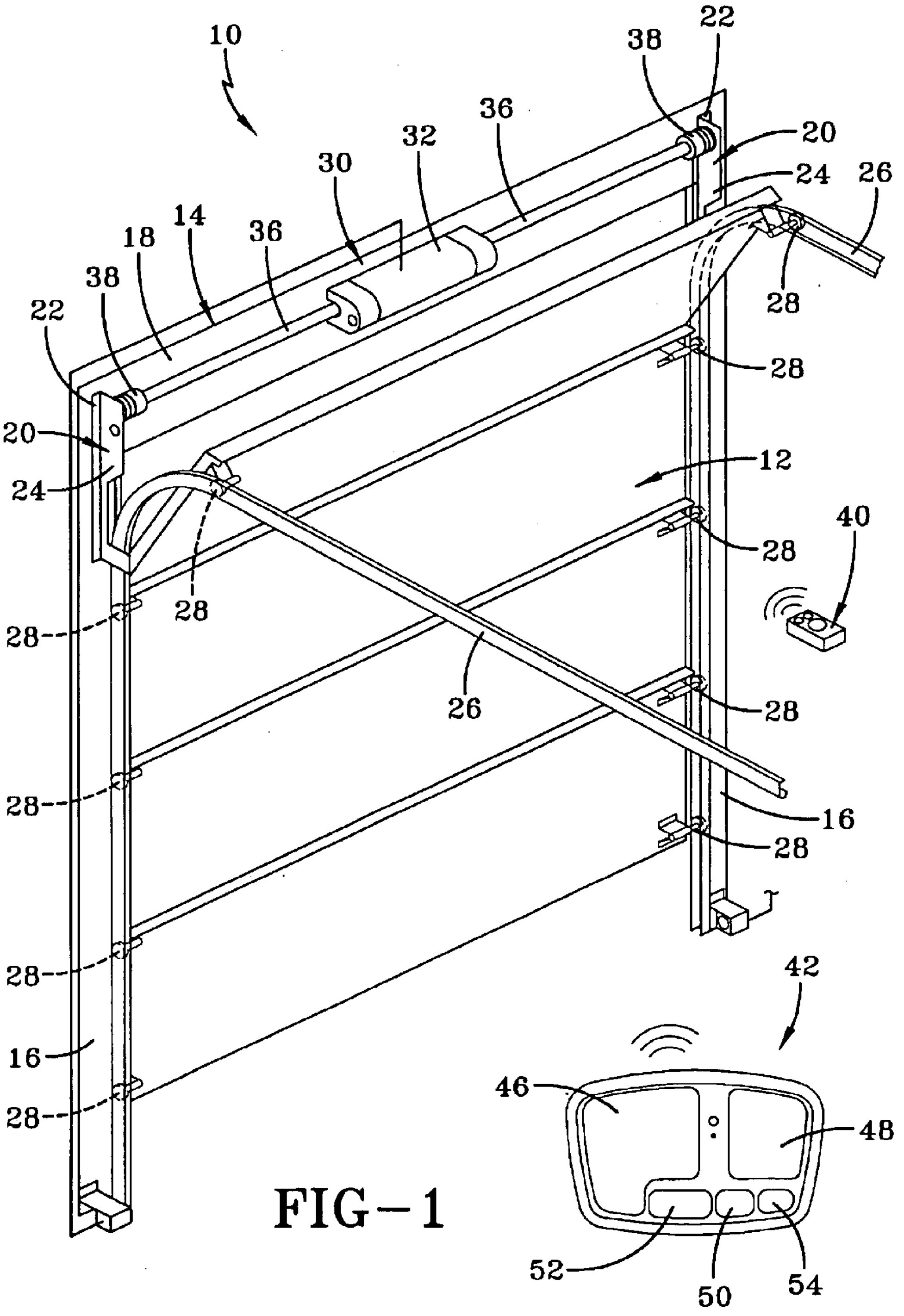
FIG. 1 is a perspective view depicting a sectional garage door and showing an operating mechanism embodying the concepts of the present invention.

A garage door operator system which incorporates the concepts of the present invention is generally indicated by the numeral 10 in FIG. 1 of the drawings. The system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism 34 and a motor 35 best seen in FIG. 2. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is specifically discussed herein, the control features to be discussed later are applicable to other types of operators used with movable barriers.

The drive shaft 36 transmits the necessary mechanical power to transfer the garage door 12 between closed and open positions. In the housing 32, the drive shaft 36 is coupled to a drive gear wherein the drive gear is coupled to the motor 35 in a manner well known in the art.

Figure 2:
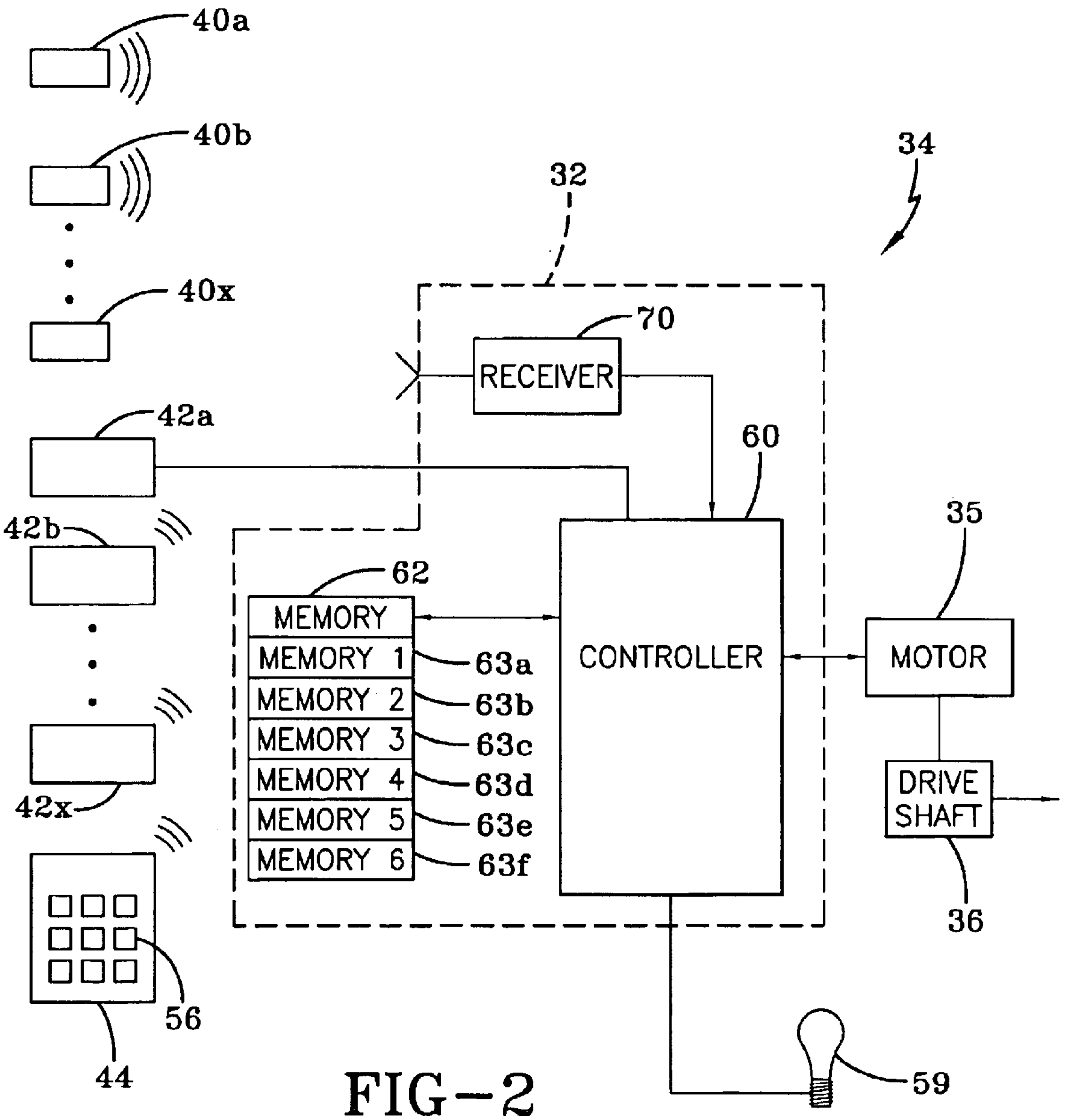
FIG. 2 is a block drawing of an operator according to the present invention.

Referring now to FIGS. 1 and 2, the counter-balancing system 30 may be controlled by a wireless remote transmitter 40; a wall station control 42 that is wired directly to the system 30 or which may communicate via radio frequency or infrared signals; and a keypad transmitter 44. The wall station control 42 is likely to have additional operational features not present in the portable transmitter 40. These features, in addition to an up/down button 46, include a light on/off button 48 to operate a light 59, a time delay close button 50, a pet height button 52, and a transmitter programming button 54. The keypad transmitter 44 includes alphanumeric keys 56 which must be actuated in a predetermined sequence to open or close the door/barrier. All three transmitting devices, at a minimum, are able to initiate opening and closing movements of the door coupled to the system 30. And although the present invention is described in the context of a sectional garage door, the teachings of the invention are equally applicable to other types of movable barriers such as single panel doors, gates, windows, retractable overhangs and any device that at least partially encloses an area.

The operator mechanism, which is designated generally by the numeral 34 in FIG. 2, is contained within the housing 32 and monitors operation of the motor and various other elements connected to the operator mechanism 34 as will be described hereinbelow. A power source (not shown) is used to energize the foregoing elements. The operator mechanism 34 includes a controller 60 which incorporates the necessary software, hardware and memory storage devices for controlling the operation of the operator mechanism 34. In electrical communication with the controller 60 is a non-volatile memory device 62 for permanently storing information utilized by the controller in conjunction with the operation of the operator mechanism 34. The memory device 62, may have a limited number of storage locations 63*a–f*—identified as memory 1, memory 2, etc.—which are used to store codes specifically associated with transmitters of any type that are learned to the operator. In most existing operator systems only six storage locations for serial numbers are provided. Of course, any number of storage locations could be provided.

Infrared and/or radio frequency signals emitted by the transmitters are received by a receiver 70 which sends the received information to a decoder contained within the controller. The codes emitted from the transmitters have a serial number that is recognized by the controller. Each type of transmitter has a pre-designated range of serial numbers that are distinguishable by the controller. In other words, the controller is able to determine whether a transmission is from a keypad, a wall station or a portable transmitter. In any event, the controller 60 converts the received radio frequency signals or other types of wireless signals into a usable format. It will be appreciated that an appropriate antenna is utilized by the receiver 70 for receiving the desired signals. It will also be appreciated that the controller 60 is capable of directly receiving transmission type signals from a direct wire source as evidenced by the direct connection to the wall station 42*a*. A skilled artisan will appreciate that a wall station 42 (or keypad 44) is either hard-wired to the operator 34 or emits an RF signal. In the preferred embodiment, the wall station is either hard-wired or wireless, but not both. Since a hard-wired device sends a signal directly to the controller there is no need to store that device's serial number in the memory device. Accordingly, only serial numbers from wireless devices are learned by the operator and stored in the memory device 62. Any number of remote transmitters 40*a–x* can transmit a signal that is received by the receiver 70 and further processed by the controller 60 as needed. Likewise, there can be any number of wall stations 42*b–x*, and keypads 44. If the signals received from any one of the transmitting devices are acceptable and stored in the memory device 62, the controller 60 generates the appropriate electrical signals for performing the desired function, such as energizing the motor 35 which in turn rotates the drive shaft 36 and opens and/or closes the movable barrier. A light 59, which may be turned on and off independently or whenever an open/close cycle is initiated, is also connected to the controller 60.

Figure 3:
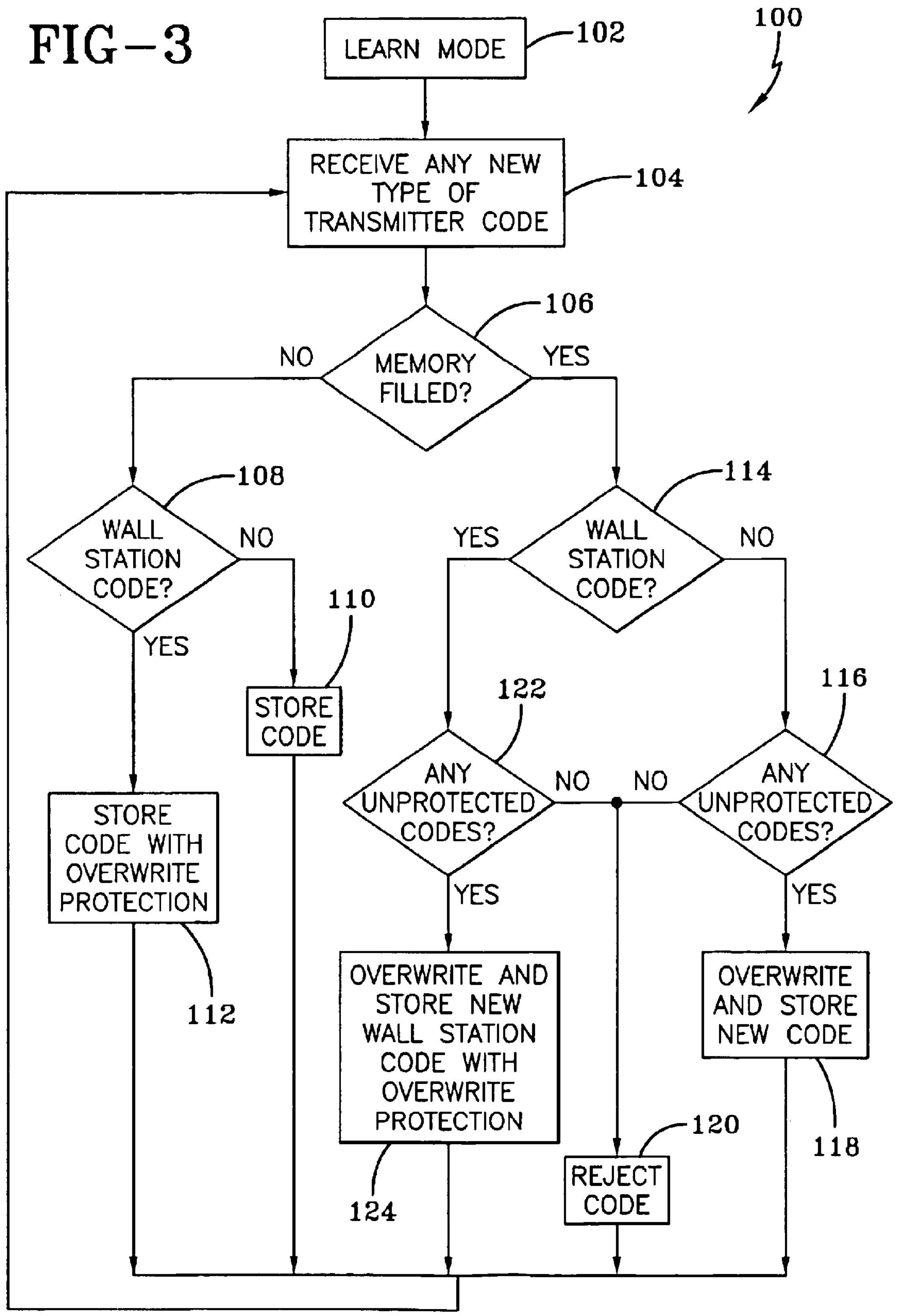
FIG. 3 is an operational flow chart employed by the operator for protecting transmitter codes associated with a specific type of transmitter.

Referring now to FIG. 3, the methodology for protecting the learned transmitter codes of a particular type of transmitter is designated generally by the numeral 100. Initially, the operator is placed in a learn mode at step 102. The skilled artisan will appreciate that the learn mode may be enabled by any number of different ways. For example, the operator may be placed directly in the learn mode by pressing a button directly associated with the operator. Alternatively, a wireless device may be used to place the operator in a learn mode upon actuation of a predetermined button or sequence of buttons from a wireless device. It will also be appreciated that the learn mode is capable of learning transmitters which send wireless signals to the operator by either infrared, radio frequency or other commonly used wireless signals.

As noted previously, the wall station type transmitter 42 has critical functions, such as the ability to program a transmitter to an operator. Accordingly, the wall station is critical to the overall performance of the operator and it is important that a wall station device not be overwritten or removed from the operator's memory. In other words, if all memory locations maintained by the operator are filled with the various types of transmitters and a user attempts to program a new portable transmitter, it is desired that the code associated with the portable transmitter, or for that matter a keypad transmitter, not erase a code associated with a wall station transmitter. If this were to occur, the wall station associated with the erased code would no longer be able to work with the operator and the other features would be disabled. And, service personnel would need to be called to clear all the memory in the operator and then relearn the transmitters to the operator.

It will further be appreciated that each type of transmitter may have its own level of priority. For example, a wall station transmitter may have the highest priority with the keypad transmitter having a priority level lower than the wall station transmitter. And the portable transmitter may have the lowest level of priority of all the transmitters. Accordingly, a new keypad transmitter identifying code (TIC) could overwrite a portable TIC, but never a wall station TIC. Likewise, a new wall station TIC will always overwrite a portable TIC and if only keypad TICs and wall station TICs are stored, a new wall station TIC will overwrite one of the keypad TICs. Of course, the hierarchy of the transmitters could be changed or supplemented. And any number of priority levels could be set corresponding to the number of different types of transmitters to be used.

Once the operator is placed in the learn mode at step 102 any new type of transmitter code to be learned or associated with the operator would be received at step 104. Next, the operator and in particular the controller, at step 106, will determine whether all the storage locations are filled or not.

If all the storage locations are not filled, then at step 108 the controller determines whether a wall station transmitter code is being received. If a wall station transmitting code is not being received, it is presumed that the code is from a portable transmitter or a keypad transmitter and the code is stored in one of the locations 63*a–f* at step 110. If, however, at step 108 it is determined that a wall station code is being transmitted, then at step 112 the code is stored in one of the available locations 63*a–f* with overwrite protection.

Returning to step 106, if all the storage locations 63 are filled then at step 114 the controller determines whether a wall station code has been received. If a wall station code has not been received then the controller at step 116 determines whether any unprotected codes remain in the plurality of storage locations 63. If there are any unprotected codes, then the controller overwrites and stores the new code in one of the unprotected storage locations 63 at step 118. If, however, at step 116 it is determined that there are not any unprotected codes then the controller at step 120 rejects the code.

Returning to step 114, if it is determined by the controller that a wall station code has been received, then at step 122 the controller determines whether any of the codes stored in the plurality of storage locations 63*a–f* contain any unprotected codes. If there are no unprotected codes, then the controller rejects the code at step 120. However, if at step 122 it is determined that there are some unprotected codes, then the controller at step 124 overwrites and stores a new wall station code with overwrite protection over the unprotected code.

Upon completion of the steps 110, 112, 118, 120 or 124, the process returns to step 104 to await receipt of any new transmitter codes during a learn mode.

Based upon the foregoing, it is readily apparent that the above-described system is advantageous inasmuch as a wall station transmitter code cannot be accidentally overwritten during any learning operations. The receiver is able to distinguish between a portable transmitter or a keypad transmitter from a wall station transmitter by each device's permanently embedded serial number. In other words, each transmitter portable, keypad or wall-station—has a specific serial number range assigned by design. Accordingly, if all receiver memory locations are filled by wall stations, then additional transmitters of any type cannot be learned. Therefore, a wall station's transmitter code cannot be inadvertently erased, which would result in the operator not being able to perform specific and necessary functions required by the user of the garage door system.

Thus, it can be seen that one or more of the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator with transmitter overwrite protection, comprising:

a plurality of different transmitters, each of said different transmitters having at least one function button that when actuated generates a signal which includes at least a transmitter identifying code and wherein one of said different transmitters has at least one critical function button;

a receiver capable of receiving said signal from any of said plurality of different transmitters;

a memory comprising a plurality of storage locations; and a controller connected to said receiver, said controller storing each said transmitter identifying code in a corresponding one of said plurality of storage locations, said controller overwriting one of said transmitter identifying codes in a corresponding one of said plurality of storage locations when a new transmitter identifying code is learned if said plurality of storage locations are full, except for said transmitter identifying codes in said plurality of storage locations for one of said plurality of different transmitters that has said critical function button.

2. The operator according to claim 1, wherein said plurality of different transmitters are selected from the group consisting of a portable transmitter, a wall station transmitter, and a keypad transmitter.

3. The operator according to claim 2, wherein one of said plurality of different transmitters having said critical function button is said wall station transmitter.

4. The operator according to claim 1, wherein one of said plurality of different transmitters having said at least one critical function button is a wall station transmitter.

5. The operator according to claim 4, wherein said controller stores each said wall station transmitter identifying code in a corresponding one of said plurality of storage locations with overwrite protection.

6. The operator according to claim 5, wherein said transmitter identifying codes of said plurality of transmitters not associated with said wall station transmitter are stored by said controller in said corresponding ones of said plurality of storage locations without overwrite protection.

7. The operator according to claim 1, wherein said controller rejects any said new transmitter identifying codes if said plurality of storage locations are all filled with identifying codes associated with a wall station transmitter.

8. A method for protecting transmitter codes stored by a movable barrier operator, comprising providing in the operator a controller with a receiver capable of receiving signal transmissions;

providing a memory device connected to said controller, said memory device having a plurality of storage locations;

learning any one of a plurality of different transmitters each of which has a transmitter identifying code contained in said signal, wherein one of said plurality of different transmitters is a wall station transmitter which has a wall station transmitter identifying code;

storing each said transmitter identifying code in a corresponding one of said plurality of storage locations and storing said wall station transmitter identifying code with overwrite protection; and overwriting one of said plurality of storage locations with a new transmitter identifying code if all said plurality of storage locations are full when a new transmitter is learned, except for those plurality of storage locations storing transmitter identifying codes with overwrite protection.

9. The method according to claim 8, further comprising providing one of said plurality of different transmitters with a plurality of different function buttons.

10. The method according to claim 9, wherein said plurality of different transmitters are selected from the group consisting of a portable transmitter, a wall station transmitter, and a keypad transmitter.

11. The method according to claim 8, further comprising:

storing transmitter identifying codes not associated with said wall station transmitter without overwrite protection.

12. The method according to claim 11, further comprising:

rejecting any new said transmitter identifying code if said plurality of storage locations are filled with wall station transmitter identifying codes.

13. A movable barrier operator system, comprising:

a plurality of transmitters enabled to operate a movable barrier each said transmitter having a transmitter identifying code, wherein certain ones of said transmitter identifying codes have priority over other ones of said transmitter identifying codes, wherein said plurality of transmitters are selected from the group consisting of a wall station transmitter, a keypad transmitter and a portable transmitter; and a controller having a memory device with a plurality of storage locations, said controller receiving and storing said transmitter identifying codes in said storage locations, wherein priority transmitter identifying codes of said wall station transmitter are never overwritten by other transmitter identifying codes.

14. The system according to claim 13, wherein said controller stores all said transmitter identifying codes received until said plurality of storage locations are filled.

15. The system according to claim 14, wherein said controller overwrites one of said other transmitter identifying codes in said memory device when a new priority transmitter identifying code is received.

16. The system according to claim 15, wherein said controller overwrites one of said priority transmitter identifying codes only when a new priority transmitter identifying code is received by said controller.

17. The system according to claim 13, wherein said wall station transmitter has the highest priority, said keypad transmitter has the second highest priority and said portable transmitter has the lowest priority.

18. The system according to claim 13, wherein said wall station transmitter has priority over said keypad transmitter and said portable transmitter.

* * * * *